United States Patent [19]

Ferguson et al.

[11] Patent Number: 5,192,208
[45] Date of Patent: Mar. 9, 1993

[54] RADAR SIMULATION FOR USE WITH A VISUAL SIMULATOR

[75] Inventors: Robert L. Ferguson, Glenwood; John R. Ellis, Ormond Beach; Kenneth B. Donovan, Daytona Beach, all of Fla.

[73] Assignee: General Electric Company, Syracuse, N.Y.

[21] Appl. No.: 396,890

[22] Filed: Aug. 21, 1989

[51] Int. Cl.⁵ ............................................. G09B 9/00
[52] U.S. Cl. .................................... 434/2; 342/169
[58] Field of Search ......................... 342/169; 434/2

[56] References Cited

U.S. PATENT DOCUMENTS 4,017,985  4/1977  Heartz ................................. 35/10.4
4,168,582  9/1979  Heidrich .
4,702,698  10/1987  Beckwith et al. .
4,780,084  10/1988  Donovan .

Primary Examiner—Mark Hellner
Attorney, Agent, or Firm—Geoffrey H. Krauss; Paul Checkovich

[57] ABSTRACT

A visual simulation system in combination with a radar simulation system may be used for generating full radar or synthetic aperture radar (SAR) radar images from a common data base that are correlated to video images of the visual system while facilitating radar image processing. The combination of visual and radar simulation systems in accordance with the present invention obviates the need for a separate stand-alone radar processor and dedicated radar data base. Simulated electronic tactical map data may also be provided.

20 Claims, 4 Drawing Sheets

RADAR SIMULATION FOR USE WITH A VISUAL SIMULATOR

BACKGROUND OF THE INVENTION

The present invention relates to radar simulation for use with a visual simulator, especially to real-time simulation of landmass returns as presented on a radar system display, and, more particularly, to a simulated synthetic aperture radar (SAR) image derived from a visual simulation system, such as a computer image generation system, and also to a full simulated real beam, monopulse and doppler beam sharpening radar displays derived from the visual simulation system.

A SAR image typically represents a patch or areal, i.e. having an area, view of the terrain and features in advance of, or in a predetermined direction from the heading of, an aircraft. Typically, a high-resolution SAR image represents a plan view of the terrain with a resolution of about 5 to 10 feet.

Previous systems have required a separate stand-alone radar processor and dedicated radar data base for developing simulated full radar or SAR images. This results in additional hardware and expense, especially if the full radar or SAR image is to be correlated to a visual image, such as an out-the-window (OTW) or forward looking infrared (FLIR) display.

It would be desirable to provide a full radar and/or SAR image generator that is economical and that may provide radar images that are readily correlated to visual images. Further, it would be desirable to use an existing visual simulation system for assisting generation of radar images. In addition, it would be desirable to use an existing visual simulation system for assisting production of simulated electronic tactical map data for display.

Accordingly, it is an object of the present invention to provide a radar image generator and method for producing radar images of a scene that are correlated to visual and/or infrared images of the scene.

Another object is to provide a radar image generator and method for producing radar images of a scene wherein the radar image generator and method may cooperate with a visual simulation system.

Yet another object is to provide a radar image generator and method for producing radar images of a scene wherein at least some processing for facilitating radar image generation may be performed by a visual simulation system.

Still another object is to provide a radar image generator and method for producing synthetic aperture radar images.

Another object is to provide a visual image generator system for producing simulated electronic tactical map data for display.

SUMMARY OF THE INVENTION

In accordance with the present invention, a system for providing simulated radar video comprises image generator means for providing visual and/or infrared video and further for providing from a predetermined viewpoint plan view data of an area to be illuminated by a radar and radar processor means coupled to the image generator means for producing the simulated radar video in response to the plan view data. The radar processor may include low pass filtering for blurring edges of objects within the simulated radar video in order to represent what is expected to be displayed from an actual radar video display.

The system may include a data base for storing visual and/or infrared data of terrain, which data include descriptors of the area to be illuminated by the radar, and for storing elevation and reflectivity data along with feature type and material surface type data. The elevation and reflectivity data along with the feature type and material surface type data are supplied to the radar processor as the plan view data, thus ensuring that the simulated radar video is correlated to the visual and/or infrared video.

In one embodiment of the present invention, the image generator includes a first channel for producing infrared video during a first interval and the plan view data during a second interval wherein the first interval is substantially greater than the second interval. By "substantially greater" is meant about twenty-nine times as great. In another embodiment the image generator includes a first channel for producing visual video and a second channel for producing the plan view data.

In another aspect of the present invention, a method for correlating a simulated radar image with a simulated visual image wherein both images are derived from terrain descriptors including visual feature, elevation and reflectivity data of the terrain comprises forming plan view data of a portion, or patch, of the terrain in response to a predetermined viewpoint, wherein the plan view data includes elevation and reflectivity data of the portion of the terrain and processing the plan view data for forming the radar video in response to the predetermined position of the radar, wherein the radar video is correlated to the visual video.

The predetermined viewpoint may be at a predetermined altitude above the portion of the terrain (the lower the viewpoint the greater the resolution and vice versa) and at a predetermined distance from the radar.

Processing for generating radar video may include filtering so that edges of objects in the radar video are blurred, rather than sharp or well-defined, so that the blurred edges more closely resemble video to be expected from an actual radar. It is noted that much of the processing for generating radar video is dedicated to degrading the video in an appropriate manner to account for natural radar effects which do not permit actual radar video to be as sharp or clear as corresponding visual video.

The method for correlating a simulated radar image with a simulated visual image may also include determining shadows (interpatch) for first features of the patch in response to second features of the terrain disposed between the radar and the patch. In addition, shadows (intrapatch) for one of the first features in response to other first features that are disposed between the one of the first features and the radar.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

Figure 1:
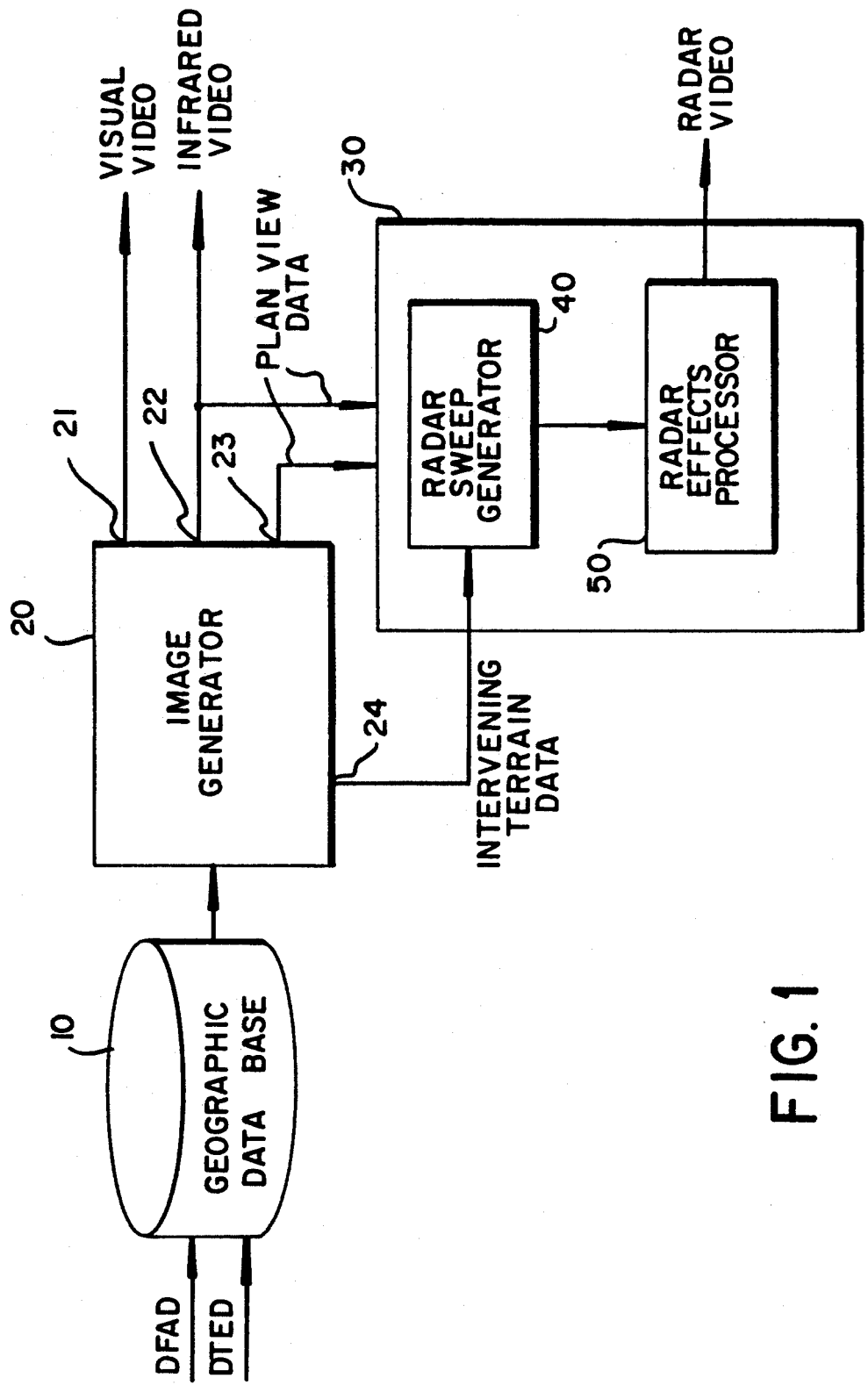
FIG. 1 is a block diagram of a radar image simulation system in accordance with the present invention.

Referring to FIG. 1, a block diagram of a radar image simulation system in accordance with the present invention is shown. The system comprises a geographic data base 10 having an output connected to an input of an image generator 20 for supplying landmass descriptors such as terrain, planimetry, and cultural objects and features, thereto, and a radar processor 30 having two inputs respectively connected to two outputs of image generator 20 for receiving plan view data. Radar processor 30 includes another input connected to yet another output of image generator 20 for receiving intervening terrain data.

Geographic data base 10 is supplied with digital feature analysis data (DFAD) and digital terrain elevation data (DTED) at respective inputs thereof such as from a data base generation system (not shown) as is known in the art. DFAD may be obtained from sources such as the Defense Mapping Agency (DMA) or from a cartographic source for defining the terrain and features of a geographic landmass area. The DFAD may be modified to be represented by polygons, or faces, whose vertices and attributes, such as color, texture, translucency, etc., are stored in geographic data base 10 for recall and use by image generator 20 during video image processing. Also stored in geographic data base 10 are elevation and reflectivity data along with feature type and surface material type which may be used during radar video generation.

Image generator 20 processes information received from data base 10 in response to operator inputs (not shown) that indicate simulated position within the stored information of data base 10 for forming video images, such as visual video and/or infrared video. Typically, image generator 20 will include one or more general and/or special purpose computers. Detailed operation of a video generator may be had by reference to U.S. Pat. No. 4,727,365 —Bunker et al entitled "Advanced Video Object Generator" assigned to the assignee hereof and incorporated in its entirety herein by reference thereto.

Data base 10 may also include infrared intensity feature information that is supplied to image generator 20 for processing to generate infrared video, such as forward looking infrared (FLIR) video that may be correlated to the visual video. Included with the infrared intensity information may be reflectivity and elevation data as explained in detail below.

For producing color visual video, image generator 20 includes one channel having three fields, or packets, of digital data, each of the three fields representing one of three primary colors designated red, green and blue. The value of the digital data for each data packet is determined by image generator 20 from data supplied by data base 10 in response to operator inputs. A second channel of image generator 20 having three packets of digital data may be used to supply infrared video. However, infrared intensity feature information may be adequately described by one packet of digital data, thus freeing or idling two packets of digital data of the second channel of image generator 20. In accordance with the present invention, the idle packets of digital data of the second channel may be assigned or designated reflectivity and elevation data, respectively, one or both of which includes the feature and material surface type data and both of which are carried along with the infrared intensity feature information.

The infrared intensity feature, elevation and reflectivity data available from output 22 of image generator 20 are supplied to radar processor 30 designated as plan view data, and are available for IR display designated as infrared video. The infrared intensity feature information data field of the second channel is used by image generator 20 to form infrared video. The infrared intensity feature, reflectivity and elevation data packets are also provided to radar processor 30 from output 22 of image processor 20. Radar processor 30 generates radar video for display in response to the reflectivity and elevation data along with the feature and material surface type data supplied thereto. Radar processor 30 selects the reflectivity and elevation data fields for processing, such as by only connecting the bit positions for the desired data or grounding the undesired infrared data bit positions of the data, such that the infrared intensity feature data field supplied thereto are ignored.

One benefit of grouping infrared intensity feature information along with corresponding reflectivity and elevation data in the second channel of image generator 20 in accordance with the present invention is that when the reflectivity and elevation data fields define characteristics of the feature described by the associated infrared intensity feature data field (which in turn is correlated to the visual data fields), the radar video generated from the reflectivity and elevation data by radar processor 30 is automatically correlated to the visual and infrared video signals produced by image generator 20. For example, if a predetermined portion of radar video is to be generated, data fields representing infrared intensity feature, reflectivity and elevation that are available from data base 10 may be concatenated to form a single data word. That is, data base 10 includes three sets of descriptors for scenes ultimately to be displayed. One set includes the traditional visual color and associated feature descriptors, another set includes the infrared intensity feature descriptors required to produce FLIR video and the third set includes reflectivity and elevation descriptors along with the feature and material surface type data necessary for generation of radar video.

Instead of sharing data with infrared video from output 22 of image generator 20, radar processor 30 may be supplied with elevation and reflectivity data along with feature and material surface type data from a dedicated channel from output 23 of image generator 20. The dedicated channel may be similar to the first or second channel of image generator 20. By using a dedicated channel to supply reflectivity and elevation data to radar processor 30, radar processor 30 is also able to generate a radar video signal that is correlated to the visual and infrared video output signals from image generator 20.

Typically at a rate of about 30 to 60 images per second, the entire infrared intensity feature, elevation and reflectivity data are updated and available for IR display. For generating simulated radar video, image generator 20 processes feature, elevation and reflectivity data for the area of interest, typically a patch at a predetermined distance from an observer viewpoint in response to an assigned or pseudo viewpoint at a predetermined altitude above the patch for providing a plan view or snapshot of the patch. The resulting feature, elevation and reflectivity data representing the plan view from image generator 20 are supplied to radar processor 30 during a predetermined sampling interval that is typically no longer than the interval needed by image generator 20 to produce an updated visual image. After the predetermined sampling interval, image generator 20 resumes processing for generating visual and infrared video. Visual and infrared video thus experiences a loss of one frame or about 3.3% of total output at a 30 hertz update rate which is nearly imperceptible to an observer. Radar processor 30 generates radar video in response to the data supplied during the sampling interval. The sampling interval is repeated as often as necessary to produce the desired SAR or radar video. For simulated SAR video the period of the sampling interval may be about four to five seconds which is consistent with operational SAR equipment.

Figure 2:
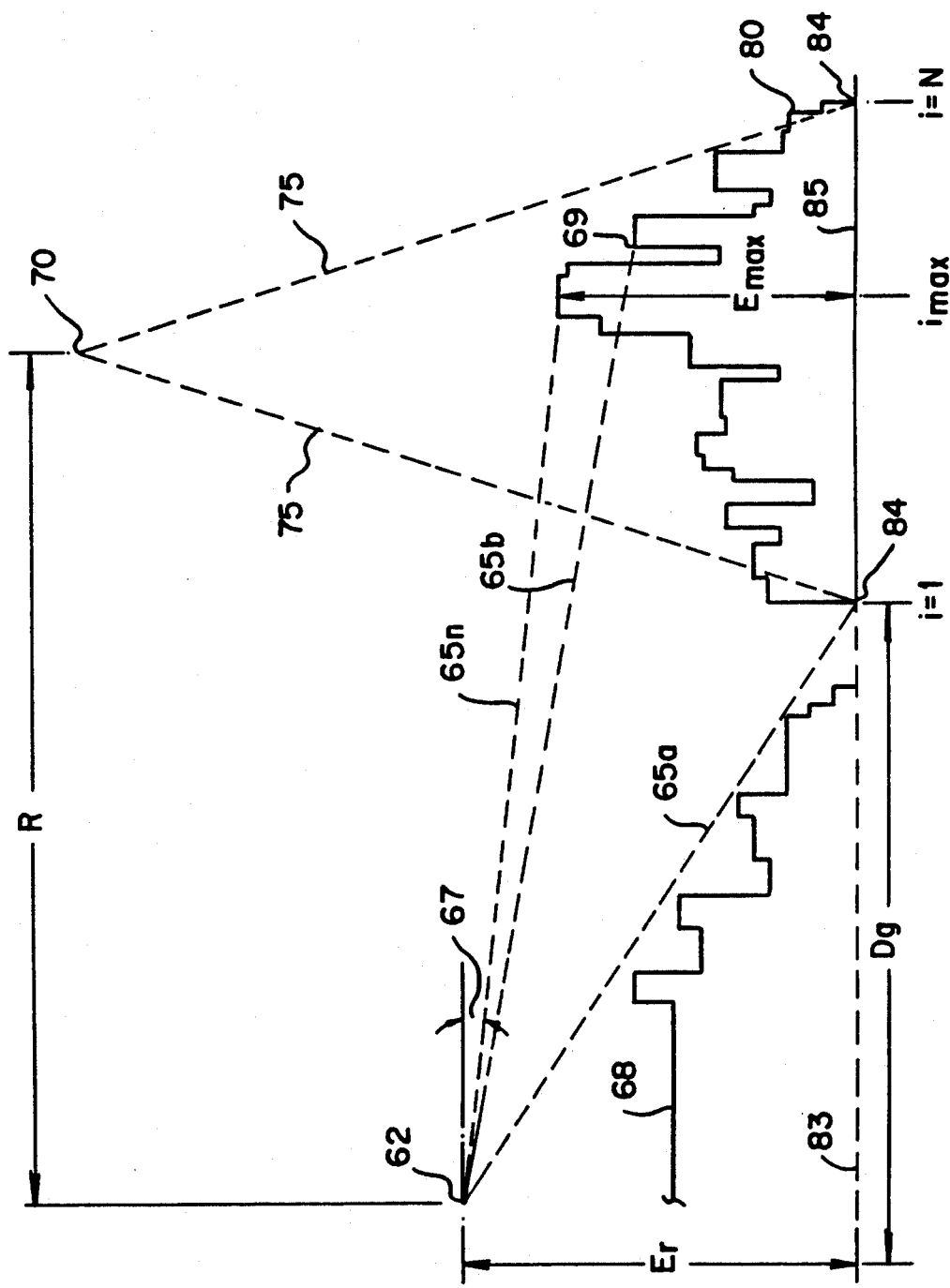
FIG. 2 is a schematic diagram illustrating the relative position between an actual radar system and an area illuminated by the radar system.

Referring to FIG. 2, a schematic diagram illustrating the relative position between an actual radar and the area illuminated by the radar is shown. A radar set 62 may be disposed at an elevation $E_r$ above a ground reference plane 83. Radar 62 may be stationary ground based or mobile, such as may be disposed on a ground vehicle or aircraft. Radiation from radar 62 illuminates features and terrain within a patch 85 of overall terrain 80. Patch 85 may include cultural features such as mountains, rivers, forests and man made features such as roads, buildings, bridges, all of whose radar return images are able to be simulated in accordance with the present invention.

In order to generate simulated radar video in accordance with the present invention, a pseudo viewpoint 70 is designated at a predetermined altitude and at a predetermined horizontal range R from radar 62 thus establishing viewpoint 70. It is not necessary that radar 62 and viewpoint 70 be at the same altitude. Viewpoint 70 also establishes the field-of-view (FOV) whose conical envelop is indicated by reference numeral 75 and which in turn establishes the breadth of patch 85.

A plan view of patch 85 as it would be observed from viewpoint 70 is generated by image generator 20 (FIG. 1) during the sampling interval and the plan view including the elevation and reflectivity data along with the feature and material surface type data representing the plan view is supplied to radar processor 30 (FIG. 1). The plan view of patch 85 is modified (as explained in detail with regard to FIG. 3) by radar processor 30 to generate radar video indicative of what would be observed at a display of the radar video if patch 85 were actually being illuminated by radar 62. In the simulated radar image, the radar image cells are of constant rectangular size, independent of range and grazing angle of radar 62. Grazing angle 67 is the angle that the radar beam from radar 62 makes with the horizon or a horizontal line at the point of contact with an object.

By selecting an appropriate altitude for viewpoint 70, which is determined by the desired resolution of the simulated radar image to be produced (higher the altitude less the resolution and conversely lower the altitude greater the resolution), image generator 20 (FIG. 1) may be beneficially employed to produce plan view data of patch 85. That is, image generator 20 will provide plan view data of patch 85 from the perspective of an observer at viewpoint 70 who would be hovering over patch 85 at the desired altitude. In order to generate a realistic radar video from the plan view data, it is necessary for radar processor 30 to modify the plan view data from image generator 20 while considering the relative position between illuminating radar 62 and patch 85 for creating radar effects such as shadows, noise degradation or blurriness, smearing and transition effects before ultimate presentation of simulated radar video signal at the output of radar processor 30.

Figure 3:
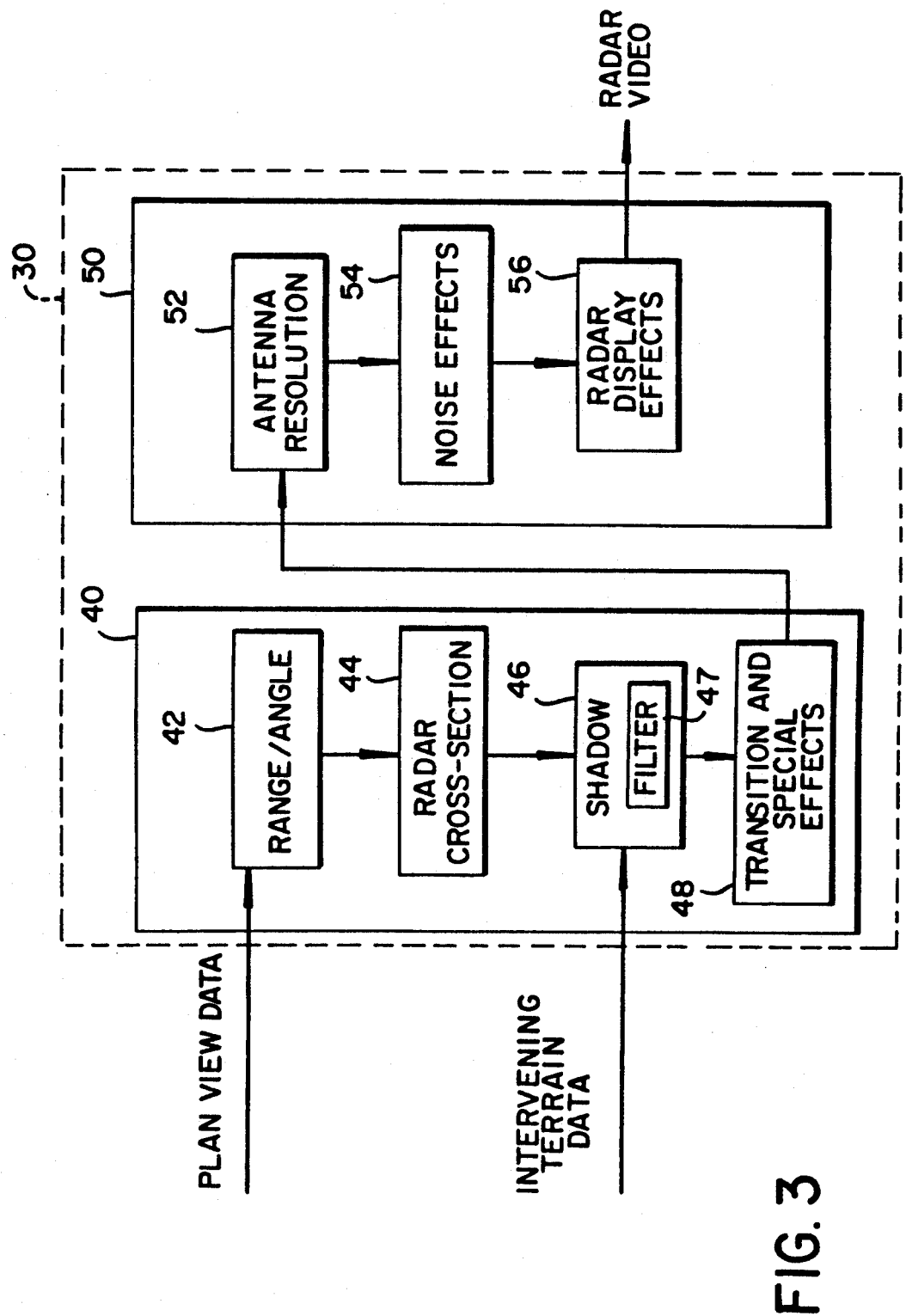
FIG. 3 is a detailed block diagram of the radar processor of FIG. 1.

Referring to FIG. 3, a detailed block diagram of radar processor 30 including radar sweep generator 40 and radar effects processor 50 is shown.

Radar sweep generator 40 includes range/angle circuitry 42, having an input which constitutes an input of both radar processor 30 and radar sweep generator 40 for receiving plan view data, radar cross-section circuitry 44 having an input connected to the output of range/angle circuitry 42, shadow circuitry 46 having an input connected to the output of radar cross-section circuitry 44 and another input which constitutes another input of both radar processor 30 and radar sweep generator 40 for receiving intervening terrain data, and transition and special effects circuitry 48 having an input connected to the output of shadow circuitry 46 and an output which constitutes the output of radar sweep generator 40.

Radar effects processor 50 comprises antenna resolution circuitry 52 having an input which constitutes the input to radar effects processor 50 connected to the output of radar sweep-generator 40, noise effects circuitry 54 having an input connected to the output of antenna resolution circuitry 52, and radar display effects 56 having an input connected to the output of noise effects circuitry 54 and an output, which constitutes the output of both radar effects processor 50 and radar processor 30, for supplying simulated radar video.

The plan view, or snapshot, data is a video image wherein each image element, or picture element (pixel), represents a small area of landmass 80 (FIG. 2) such that the combination of all pixels in the plan view image represents the entire area of patch 85 (FIG. 2) that may be illuminated by radar 62 (FIG. 2). For each pixel of the plan view image, image generator 20 computes radar reflectivity, elevation and incidence of the pixel area and supplies the results to radar processor 30.

The intervening terrain data 68 of terrain 80 define the landmass area between the position of radar 62 (FIG. 2) and patch 85. Shadows are computed for patch 85 due to intervening terrain 68 of terrain 80 between radar 62 and patch 85 (inter-patch shadows) and also due to terrain and three-dimensional natural and man-made objects within patch 85 (intra-patch). A ray tracing algorithm is used to compute intra-patch shadows. An example of a ray tracing algorithm may be had by reference to U.S. Pat. No. 4,821,212 —Heartz assigned to the instant assignee. A shadow mask is computed using a front-to-back elevation grid scan, wherein grazing angles are computed and compared for each elevation grid value within each column. Each elevation grid value is the sum of the interpolated terrain elevation and the height of three-dimensional objects on the terrain. Shadow circuitry 46 may include a general purpose computer for executing the following program which may be used for determining intra-patch shadows.

```
FOR j = 1 to N
  i_max = 1
  FOR i = 1 to N
```

-continued $$TAN(j,i_{max}) = (E_r - E_{imax})/(Dg + F^*i_{max})$$
$$TAN(j,i) = (E_r - E_i)/(Dg + F^*i)$$
IF $TAN(j,i_{max}) <$ $TAN(j,i)$ THEN $S(j,i) = 0$
ELSE $S(j,i) = 1$, $i_{max} = 1$ Wherein, j=column number (max of N) or azimuth angle step across patch i=row number (max of N) or ground range step into patch from radar $E_i$=elevation at row i $i_{max}$=i (ground range) at max elevation $E_r$=elevation of radar $E_{imax}$=max elevation sample encountered in this column so far Dg=ground distance from radar to beginning of patch (feet)

F=Scale factor in i direction (e.g. feet/cell)

S (i, j)=shadow mask memory value;
0=shadow
1=no shadow

The intervening terrain data are represented by a grid of elevation values wherein only those elevation values that could potentially occult patch 85 (FIG. 2) are processed. Processing of intervening terrain data may be performed analogously to determine intra-patch shadows before processing for intra-patch shadows but after the direction of patch 85 with respect to radar 62 is identified. Processing of intervening terrain data may be performed in parallel with processing for the snapshot view for patch 85.

The ray tracing algorithm begins at the intersection of ray 65a representing a radar beam with margin 84 of patch 85. It should be recognized that each ray 65 will proceed vertically from margin 84 along a predetermined column j. The number of columns is determined by the resolution desired across the azimuth of patch 85. For example, in proceeding from ray 65a along column $j_l$, a view ray $65_n$ encounters an object at $i_{max}$ having elevation $E_{imax}$. The tangent of the grazing angle at $i_{max}$ is $(E_r - E_{imax})/(Dg + F^*i_{max})$. The tangent of the grazing angle of objects beyond $i_{max}$ $(E_r - E_i)/(Dg + F^*i)$. If the tangents of the grazing angle of objects beyond imax are less than the tangent of the grazing angle of $i_{max}$ then the more remote objects from radar 62 are in shadow. For the first encountered tangent of the grazing angle that is equal to or greater than the tangent of the grazing angle at $i_{max}$ than the value of i at the more remote object is substituted for the value of $i_{max}$ and the algorithm proceeds. View ray 65b represents a view ray of column $j_z$ striking an object at point 69.

Range/angle circuitry 42 determines the ground range, slant range and angle of incidence to each pixel of area 85. These determinations may include calculations and computations, and, if desired, simplifications or assumptions for facilitating and expediting processing, such as slant range to horizontal, or ground range, plus an elevation offset.

Radar cross-section circuitry 44 determines the reflected power from a pixel in response to a reflectivity code that identifies the type of material found in the pixel area and the incidence of the pixel relative to a simulated radar wave front.

One benefit of connecting image generator 20 and radar processor 30 for cooperation in accordance with the present invention is that many computations needed to determine radar cross section of a pixel in real time can be readily performed by image generator 20, thus reducing processing needed to be performed by radar processor 30 while avoiding having to include redundant circuitry in radar processor 30. For example, illumination function equations can be applied to modify the radar reflectivity as a function of the instaneous angle of surfaces to a simulated radar wave, and the texture capability of image generator 20 can be used to provide texture for the simulated radar video.

Shadow circuitry 46 determines whether each pixel is visible or whether it is partially or totally shadowed by intervening terrain or features of another pixel within patch 85 (FIG. 2). Prior radar simulators have produced simulated radar video having unrealistically sharp shadow edges. Real radar images typically have blurred or non-distinct edges of shadows. In order to represent the simulated shadows generated in accordance with the present invention more realistically, shadow circuitry 46 includes filtering circuitry 47, such as a low pass filter, for smoothing or blurring any sharp edges of shadows.

Transition and special effects circuitry 48, antenna resolution circuitry 52, noise effects circuitry 54 and radar display effects circuitry 56 all include functions and modifications that affect the ultimate simulated power level of the radar video signal from radar processor 30.

Transition and special effects circuitry 48 modifies the signal received at its input from shadow circuitry 46 to account for natural phenomena such as atmospheric attenuation due to humidity and seasonal changes including the effect of snow and ice. Special effects circuitry 48 also simulates the effects of far shore enhancement. As a radar beam illuminates a boundary between water and land or between a substantially horizontal surface and a substantially vertical surface, the abrupt physical transition results in an enhancement or increase in brightness at the boundary, indicating that more of the actual radar beam is reflected from the boundary and is detected by the actual radar set. Special effects circuitry 48 detects these boundary transition cases and simulates enhancement of the boundary by increasing the value of the simulated radar return signal along the boundary. The modified signal is supplied to antenna resolution circuitry 52.

Antenna resolution circuitry 52 accounts for the attenuation due to differences in the horizontal and vertical beam patterns of an actual radar beam by modifying the signal received at its input. Typically smoothing or blurring is required in the horizontal direction. The modified signal is provided by antenna resolution circuitry 52 to noise effects circuitry 54 which modifies the signal to account for the effects of the actual radar receiver. These modifications include simulating the gain and noise of the receiver transfer characteristics. The modified signal is supplied to radar display effects circuitry 56.

Radar display effects 56 modifies the signal received from noise effects circuitry 54 to account for features of an actual radar including sensitivity time constant, automatic gain control, post detection integration and internal processing delays. Radar display effects circuitry 56 also provides symbology and alphanumerics for the ultimate radar display as desired. The modified signal from radar display effects circuitry 56 is provided to the output of radar processor 50 as the radar video signal.

The system as illustrated in FIG. 1 can simulate various radar modes including real beam, doppler beam sharpening and mono-pulse resolution, and high resolution synthetic aperture radar. If the desired radar mode updates the radar video by radial scanning, that is updating the image as the antenna scans clockwise or counterclockwise, then image generator 20 produces snapshots covering a small angular segment from the position of radar 62 (FIG. 2) and radar processor 30 computes multiple scan line updates that fall within the segment.

If the selected radar mode updates the entire radar image at once, after a predetermined update processing interval for allowing radar processor 30 to generate updated radar video, then image generator 20 may produce one or more snapshots of the desired area to be illuminated by radar 62 (FIG. 2). Radar processor 30 processes the snapshots in any desired order for generating updated radar video ultimately for providing an updated entire radar image.

Figure 4:
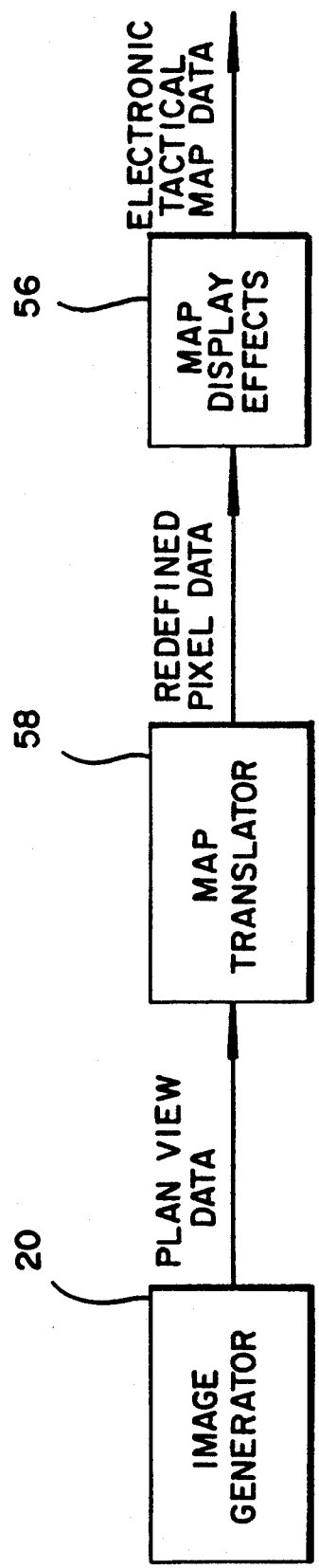
FIG. 4 is a block diagram of a system for generating electronic tactical map data in accordance with the present invention.

Referring to FIG. 4, another embodiment of the present invention is shown.

Electronic tactical map (ETM) data, which may be processed to present a map of a predetermined area of terrain on a display, such as a cathode ray tube, may be simulated. Image generator 20 produces a plan view snapshot of the desired area of terrain as hereinbefore explained. Map translator 58 receives the snapshot data from image generator 20 and redefines each pixel of the snapshot to indicate a desired color or gray scale in response to a characteristic of the data for each pixel, such as elevation, texture and reflectance or in response to predetermined inputs from the operator. Redefined pixel data is provided to radar display effects circuitry 56 which adds desired symbology and alphanumerics to the redefined data for forming the electronic tactical map data which may be provided to a display system (not shown) for ultimate display.

Thus has been illustrated and described a radar image generator and method for producing radar images of a scene that are correlated to visual and/or infrared images of the scene and further wherein the radar image generator and method may cooperate with a visual simulation system and at least some processing for facilitating radar image generation may be performed by the visual simulation system. Also shown and described is a radar image generator and method for producing synthetic aperture radar images and a visual image generator system for producing simulated electronic tactical map data for display.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A system for providing simulated radar video, comprising:
    image generator means for providing visual and/or infrared video and further for providing from a predetermined viewpoint plan view data of an area to be illuminated by a radar; and
    radar processor means coupled to the image generator means, the radar processor means for producing the simulated radar video in response to the plan view data.

2. The system as in claim 1, wherein the radar processor means includes filtering means for blurring edges of objects within the simulated radar video.

3. The system as in claim 1, further including a data base for storing visual and/or infrared data of terrain, which data include descriptors of the area to be illuminated by the radar and further for storing elevation and reflectivity data of the area to be illuminated by the radar, the elevation and reflectivity data being supplied to the radar processor means as the plan view data, whereby the simulated radar video is correlated to the visual and/or infrared video.

4. A system for providing simulated radar video, comprising:
    image generator means for providing visual and/or infrared video and further for providing from a predetermined viewpoint plan view data of an area to be illuminated by a radar, wherein the image generator includes a first channel for producing both infrared video and the plan view data; and
    radar processor means coupled to the image generator means, the radar processor means for producing the simulated radar video in response to the plan view data.

5. The system in claim 4, wherein the first channel is for producing infrared video during a first predetermined interval and is further for producing the plan view data during a second predetermined interval, the first predetermined interval substantially greater than the second predetermined interval.

6. The system as in claim 4, wherein the first channel includes three fields of data for infrared, elevation and reflectivity data, respectively.

7. A system for providing simulated radar video, comprising:
    image generator means for providing visual and/or infrared video and further for providing from a predetermined viewpoint plan view data of an area to be illuminated by a radar, wherein the image generator means include a first channel for producing visual video and a second channel for producing the plan view data; and
    radar processor means coupled to the image generator means, the radar processor means for producing the simulated radar video in response to the plan view data.

8. A method for correlating a simulated radar image with a simulated visual image wherein both images are derived from predetermined descriptors of terrain, the descriptors including visual feature, elevation and reflectivity data of the terrain, comprising:
    forming plan view data of a portion of the terrain in response to a predetermined viewpoint, the plan view data including elevation and reflectivity data of the portion of the terrain; and
    processing the plan view data for forming the radar video in response to the predetermined position of a radar, wherein the radar video is correlated to the visual video.

9. The method as in claim 8, wherein the step of processing includes filtering for blurring edges of objects of the terrain.

10. The method as in claim 8, wherein the plan view data include feature type and material surface type data.

11. A method for correlating a simulated radar image with a visual image wherein both images are derived from predetermined descriptors of terrain, the descriptors including visual feature, elevation and reflectivity data of the terrain, comprising:

forming plan view data of a portion of the terrain in response to a predetermined viewpoint, the plan view data including elevation and reflectivity data of the portion of the terrain; and processing the plan view data for forming the radar video in response to the predetermined position of a radar, wherein the predetermined viewpoint is at a predetermined altitude above the portion of the terrain and at a predetermined distance from the radar and further wherein the step of processing includes determining shadows for first features of the portion of the terrain in response to second features of the terrain disposed between the radar and the portion of the terrain, whereby the radar video is correlated to the visual video.

12. The method as in claim 11, wherein the step of processing includes determining shadows for one of the first features in response to other first features that are disposed between the one of the first features and the radar.

13. The method as in claim 12, wherein the step of determining shadows includes using a view ray algorithm such that the tangent of a grazing angle to a first object and the tangent of a grazing angle of a second object along a same view ray, the second object more remote from the radar than the first object, is determinative of whether the second object is shadowed by the first object.

14. A method for correlating a simulated radar image with a simulated visual image wherein both images are derived from predetermined descriptors of terrain, the descriptors including visual feature, elevation and reflectivity data of the terrain, comprising:

generating visual images during a first predetermined interval forming plan view data of a portion of the terrain in response to a predetermined viewpoint during a second predetermined interval, the first predetermined interval being greater than the second predetermined interval, the plan view data including elevation and reflectivity data of the portion of the terrain; and processing the plan view data for forming the radar video in response to the predetermined portion of a radar, wherein the radar video is correlated to the visual video.

15. The method as in claim 8, wherein the radar video is for simulating radar video of a synthetic aperture radar.

16. A method for generating radar video, comprising:

producing a plurality of frames of first visual video during a predetermined first interval, wherein each frame is produced during a respective second interval, the second interval being shorter than the first interval;

providing a frame of second visual video with respect to a predetermined viewpoint during one of the respective second intervals for further processing; and processing the frame of second visual video for forming the radar video.

17. The method as in claim 16, wherein the step of processing includes filtering for blurring edges of objects in the radar video.

18. The method as in claim 16, wherein data for producing the first visual video and for providing the second visual video are available from a common source so that the radar video is correlated to the first visual video.

19. The method as in claim 16, wherein the predetermined viewpoint is disposed at a predetermined altitude above a terrain such that the second visual video is a plan view of a portion of the terrain.

20. A method for generating electronic tactical map data, comprising:

producing a plurality of frames of first visual video during a predetermined first interval, wherein each frame is produced during a respective second interval, the second interval being shorter than the first interval;

providing a frame of second visual video with respect to a predetermined viewpoint during one of the respective second intervals for further processing, wherein the viewpoint is disposed at a predetermined altitude above a terrain such that the second visual video is a plan view of a portion of the terrain; and modifying the second visual video in response to characteristics of features of the second visual video for forming the tactical map data.

* * * * *